United States Patent [19]

Ragaller

[11] Patent Number: 5,064,324
[45] Date of Patent: Nov. 12, 1991

[54] FASTENING SCREW FOR ASSEMBLY PLATES
[75] Inventor: Max Ragaller, Krün, Fed. Rep. of Germany
[73] Assignee: Marker Deutschland GmbH, Munich, Fed. Rep. of Germany
[21] Appl. No.: 540,379
[22] Filed: Jun. 19, 1990
[30] Foreign Application Priority Data
Jun. 20, 1989 [DE] Fed. Rep. of Germany ... 8907527[U]
[51] Int. Cl.$^5$ .............................................. F16B 21/00
[52] U.S. Cl. ................................... 411/337; 411/304; 411/999
[58] Field of Search ............... 411/999, 337, 508, 512, 411/900, 914, 352, 103, 304, 303, 301, 302, 305; 403/21

[56] References Cited
U.S. PATENT DOCUMENTS 3,256,671  6/1966  Handley ........................ 411/957 X
3,285,310 11/1966  Boots et al. ........................ 411/301
3,554,258  1/1971  Duffy .................................. 411/301
3,770,036 11/1973  Sherman ........................ 411/999 X
3,811,733  5/1974  De Ragnaucourt et al. ... 411/999 X
4,512,698  4/1985  Muad .................................. 411/337
4,813,834  3/1989  Smith .................................. 411/337
4,844,677  7/1989  Schwartzman ..................... 411/512

Primary Examiner—Rodney M. Lindsey
Attorney, Agent, or Firm—D. Peter Hochberg; Mark Kusner; Louis J. Weisz

[57] ABSTRACT

Threaded fasteners adapted to be preliminarily inserted in bore holes of assemblies are modified to prevent their dislodgement by placing an elastic, plastic material on the fastener shaft in an amount sufficient to protrude outwardly from the shaft far enough to frictionally engage the wall of the bore hole into which the fastener is to be inserted. In a preferred embodiment, a polyamide plastic is placed on the shaft of the fastener in the region of the threaded portion thereof.

4 Claims, 1 Drawing Sheet

FASTENING SCREW FOR ASSEMBLY PLATES

FIELD OF THE INVENTION

This invention relates to the retention of fasteners in ski binding components prior to the installation of the components in assemblies. More particularly, this invention relates to the modification of threaded fasteners prior to their temporary insertion in bore holes of ski binding components so that they cannot be subsequently inadvertently dislodged and disassociated from the components. Specifically, this invention relates to the positioning of an adherent piece of elastic, plastic material on the shaft of a threaded fastener, the material being dimensioned to extend outwardly from the shaft of the fastener sufficiently far to frictionally engage the walls of bore holes of components into which the fastener is inserted.

BACKGROUND OF THE INVENTION

Commonly, when components are to be installed at a remote location in connected association with other components, for example ski binding components, the components are shipped to the location together with the fasteners to be used in effecting their connection. Oftentimes in such cases, however, the fasteners become accidentally disassociated from the components with which they are to be used in the course of shipment to the location. Such occurrences necessitate replacement of the fasteners, and otherwise result in inconvenience and added expense to the assembler.

In the past, attempts have been made to avoid this problem through the use of auxiliary elements in association with the components to be fastened, the elements serving to prevent the dislodgement of the fasteners by engaging their shafts or heads. However, such elements complicate the design of the components in instances where they form an integral part thereof. In addition, even in instances where they constitute a part separate from the component, the elements undesirably add to the expense of the component.

BRIEF DESCRIPTION OF THE INVENTION

In view of the preceding, therefore, it is a first aspect of this invention temporarily to secure fasteners to ski binding components which are to be installed in assemblies at remote locations.

It is a second aspect of this invention to avoid the necessity of providing auxiliary fastener-retaining elements for components to be later fastened to other components in assemblies.

Another aspect of this invention is to modify threaded fasteners so that they are frictionally retained in bore holes located in components which they are designed subsequently to secure in assemblies.

An additional aspect of this invention is to allow threaded fasteners to accompany the components which they are eventually to fasten, without risk of inadvertent disassociation therefrom.

A further aspect of this invention is to provide a method of securing threaded fasteners in bore holes in ski binding components so that the ski binding components can be shipped from a point of manufacture, to a point of installation without loss of the fasteners.

The foregoing and still further aspects of the invention are furnished by a threaded fastener provided with a retention element forming an integral part of said fastener and projecting outwardly from the shaft of the fastener, said retention element comprising substantially elastic, plastic material adhered to the shaft of said fastener.

The foregoing and additional aspects of the invention are furnished by a ski binding component provided with a fastener according to the preceding paragraph located in a bore hole in said component, the retention element of said fastener extending outwardly from the shaft of the fastener far enough to frictionally engage the side of said bore hole.

BRIEF DESCRIPTION OF THE DRAWINGS

This invention will be better understood when reference is had to the following drawings, in which like-numbers refer to like-parts, and in which.

DETAILED DESCRIPTION OF THE INVENTION

Figure 1:
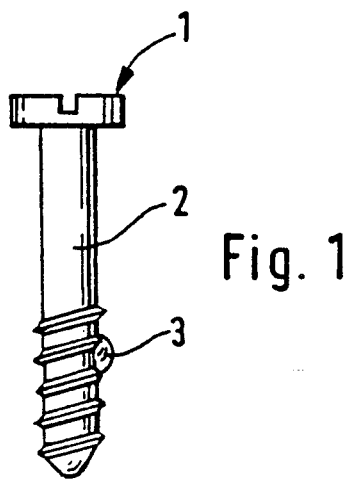
FIG. 1 shows a side elevation of a threaded fastener of the invention.

FIG. 1 shows a side elevation of a threaded fastener of the invention. The fastener, generally 1, is comprised of a shank portion 2 and a threaded portion, the shank portion and the threaded portion together comprising the shaft portion. As shown, a dome-shaped retaining element 3 extends from the threaded portion of the threaded fastener 1.

While the retaining element 3 in FIG. 1 is positioned so that it extends from the threaded portion of the fastener's shaft, as shown in the Figure from the root portion of the thread, it can be located elsewhere if desired. It can, for instance, be positioned adjacent a crest area of the fastener's thread, or it can be located on the shank portion 2.

The retaining element 3 is formed from a substantially elastic, plastic material, desirably having a high coefficient of friction to enable it to maintain the fastener securely frictionally engaged with the periphery of the bore hole of the component in which it is inserted. Thermoplastic materials such as polyamides are especially suited to the purpose of the invention since they are sufficiently elastic to be compressed to the degree necessary to allow their insertion in a component bore hole, and thereafter to reassume their expanded structure, thus causing them to become immobile due to their frictional engagement with the side of the bore hole, as previously described.

In the case of thermoplastic polyamides, a melted drop of such material may be readily positioned on the shaft of a fastener, where it forms an adhering protuberance extending outwardly therefrom.

Figure 2:
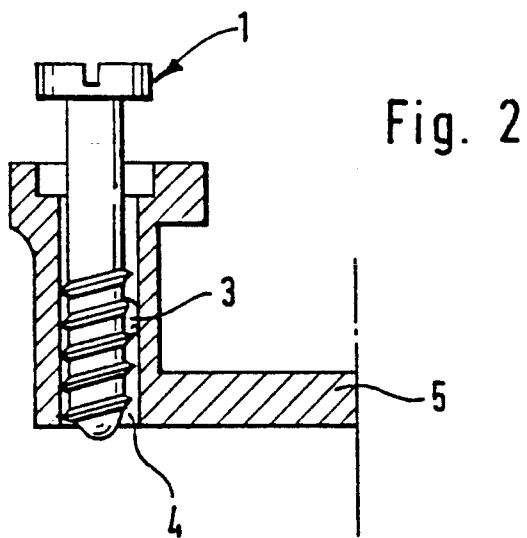
FIG. 2 illustrates a side elevation of a threaded fastener inserted in a bore hole of a component shown in cross-section.

FIG. 2 illustrates a side elevation of a threaded fastener, generally 1, inserted in a bore hole 4 of a component shown in cross-section. In FIG. 2, the bore hole is located in a ski binding assembly plate 5.

The function of the retaining element 3 is clearly illustrated in the Figure. As may be seen, the retaining element must extend outwardly from the shaft of the threaded fastener 1 far enough to frictionally engage the side of the bore hole 4. In the Figure, the elastic retaining element 3 has been forced into the bore hole 4, compressing the elastic retaining material so that it bears forcefully against the periphery of the bore hole, preventing the fastener from being inadvertently dislodged from the hole, but allowing it to be moved inwardly when its threaded engagement with an additional component is desired.

While as previously stated, the retaining element 3 can be located either adjacent the threaded portion or the shank portion of the fastener, in a preferred embodiment, it is located adjacent the threaded portion since when the fastener is fully threaded into a final assembly, the retaining element 3 then serves the function of frictionally engaging the hole into which it has been threaded, preventing the fastener from being loosened during use of the binding.

While in accordance with the patent statutes, a preferred embodiment and best mode has been presented, the scope of the invention is not limited thereto, but rather is measured by the scope of the attached claims.

What is claimed is:

1. A threaded fastener having a head portion and a shaft portion provided with a retention element forming an integral part of said fastener and projecting outwardly from a point located on the circumference of the shaft portion of the fastener and intermediate adjacent turns of the thread of said fastener, said retention element comprising a drop of substantially elastic, plastic material adhered to a threaded portion of the shaft portion of said fastener.

2. A fastener according to claim 1 wherein said retention element is formed from a polyamide.

3. A fastener according to claim 2 wherein a said polyamide has been applied in liquid form to said shaft, and has subsequently solidified to form a dome-shaped projection extending from the shaft.

4. A threaded fastener according to claim 1 for location in a bore hole in a ski binding component, said retention element of said fastener extending outwardly from said shaft portion of the fastener far enough to frictionally engage the interior side wall of said bore hole.

* * * * *